(12) United States Patent
Gauli

(10) Patent No.: US 10,882,150 B2
(45) Date of Patent: Jan. 5, 2021

(54) AUTONOMOUS PROCESSING STATION

(71) Applicant: ARRTSM GmbH, Dettenhausen (DE)

(72) Inventor: Yudhisthir Gauli, Dettenhausen (DE)

(73) Assignee: ARRTSM GmbH, Dettenhausen (DE)

( * ) Notice: Subject to any disclaimer, the term of this patent is extended or adjusted under 35 U.S.C. 154(b) by 184 days.

(21) Appl. No.: 16/111,280

(22) Filed: Aug. 24, 2018

(65) Prior Publication Data

US 2020/0061763 A1 Feb. 27, 2020

(51) Int. Cl.
*B23Q 7/05* (2006.01)
*B23Q 7/00* (2006.01)

(52) U.S. Cl.
CPC ........... *B23Q 7/05* (2013.01); *B23Q 7/005* (2013.01); *B23Q 2703/04* (2013.01)

(58) Field of Classification Search
CPC ... B23Q 7/00; B23Q 7/04; B23Q 7/05; B23Q 16/00; G05B 19/401
See application file for complete search history.

(56) References Cited

U.S. PATENT DOCUMENTS

| | | | | |
|---|---|---|---|---|
| 6,008,471 A * | 12/1999 | Alborante | ............. | B62D 65/02 219/158 |
| 6,193,142 B1 * | 2/2001 | Segawa | ................ | B23K 37/047 219/148 |
| 6,438,842 B1 * | 8/2002 | Raami | .................... | B62D 65/00 228/49.1 |
| 6,851,166 B1 * | 2/2005 | Demit | .................... | B62D 65/02 29/281.5 |
| 8,713,780 B2 * | 5/2014 | Kilibarda | ............... | B62D 65/02 29/430 |
| 2006/0167587 A1 * | 7/2006 | Read | .................. | G05B 19/4182 700/245 |
| 2020/0061763 A1 * | 2/2020 | Gauli | .................... | B23Q 7/005 |

* cited by examiner

*Primary Examiner* — Lee D Wilson
(74) *Attorney, Agent, or Firm* — Renner, Otto, Boisselle & Sklar, LLP

(57) ABSTRACT

An autonomous processing station, in particular for machining a plate-shaped workpiece, for example, including a roller conveyor and a suction table disposed beneath the roller conveyor for clamping the workpiece. The roller conveyor includes movable rollers, in a longitudinal center region of the roller conveyor, so as to be movable to the side beneath stationary rollers at ends of the roller conveyor, so that the workpiece can be lowered through the resulting opening onto the suction table.

7 Claims, 6 Drawing Sheets

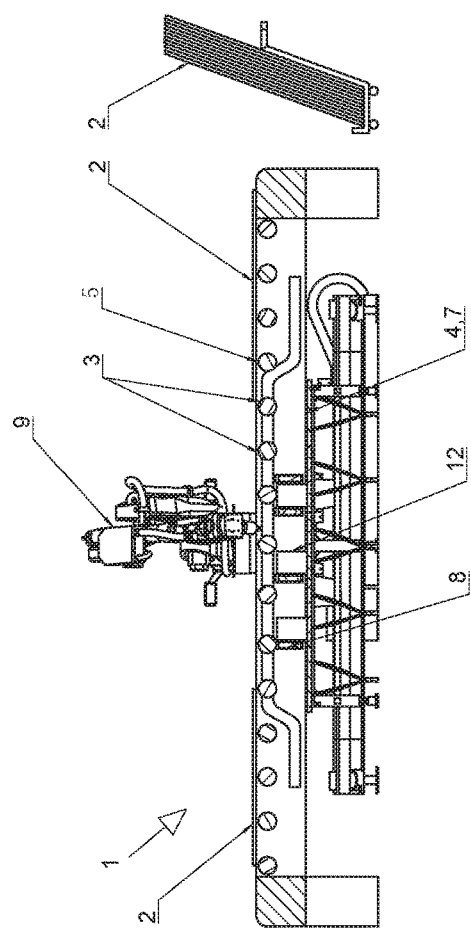
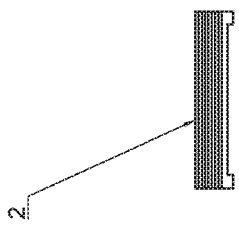
Fig. 1
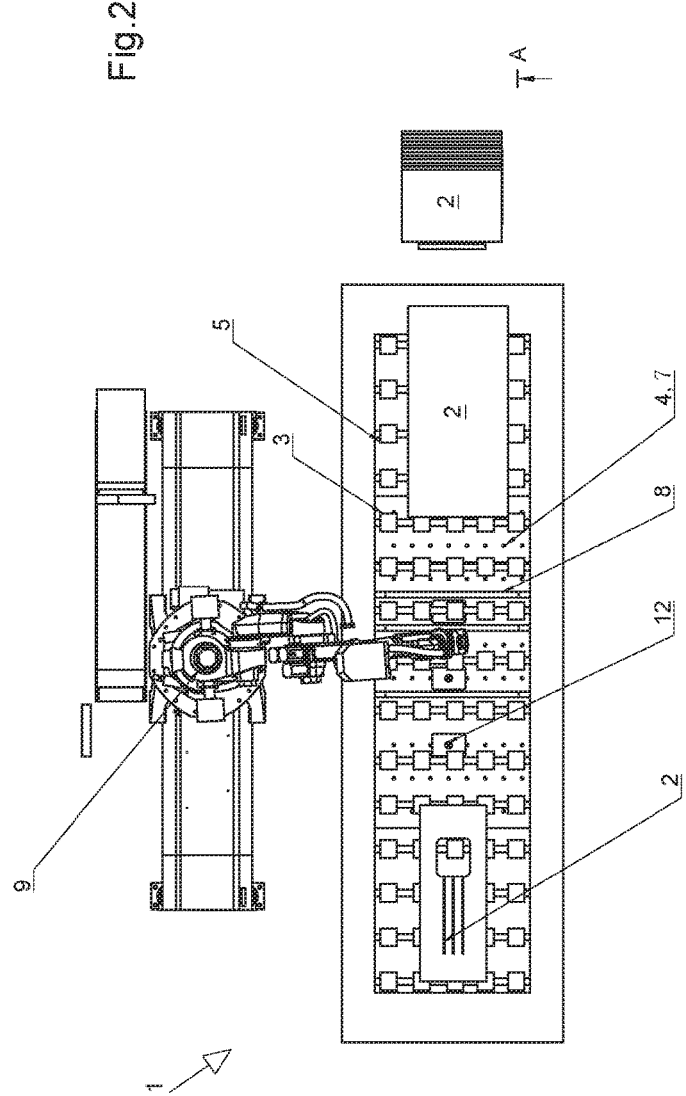
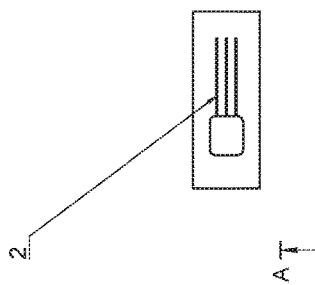
Fig. 2

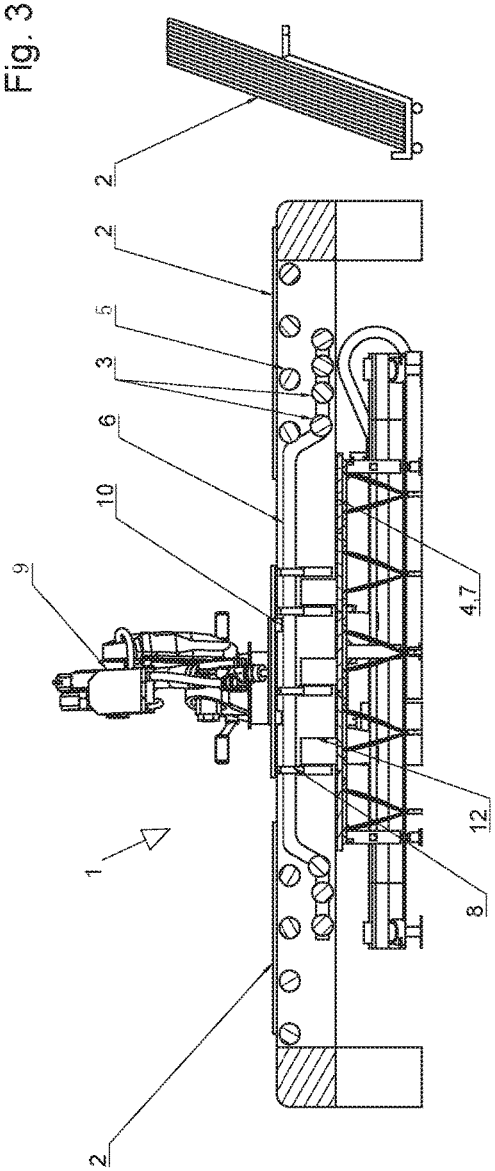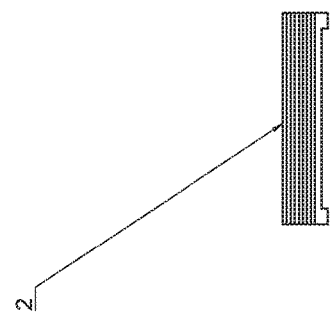
Fig. 3
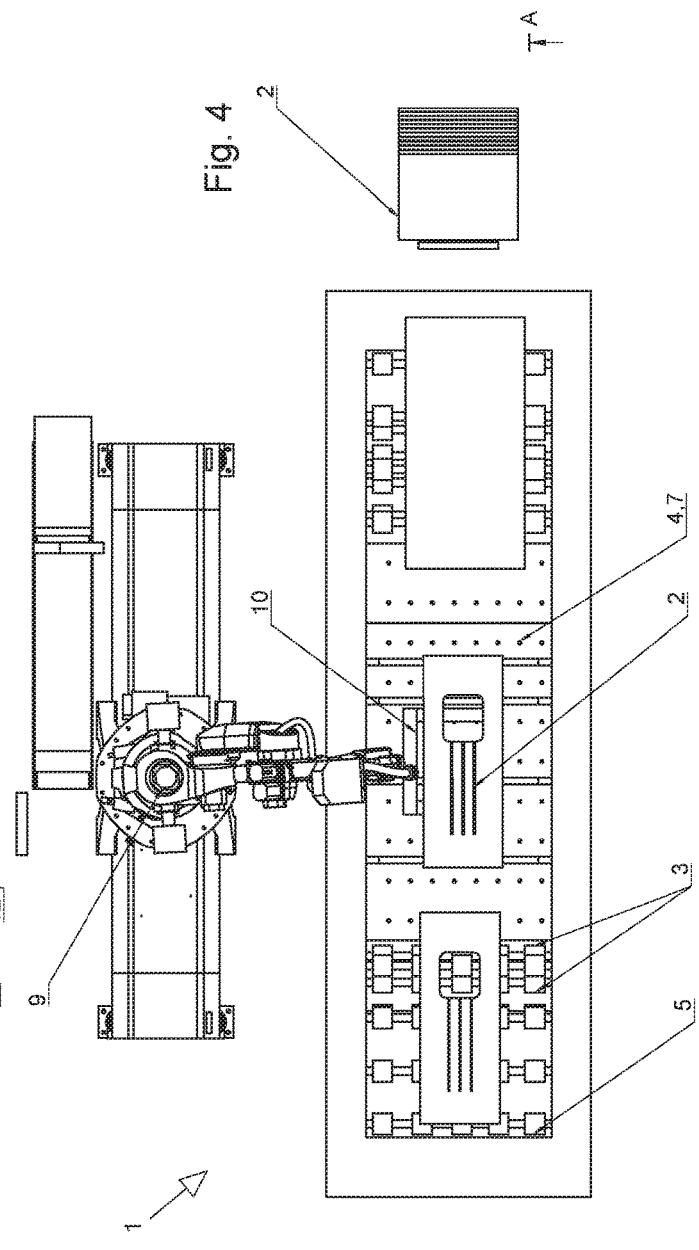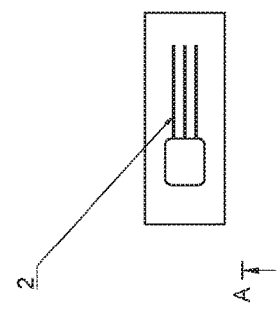
Fig. 4

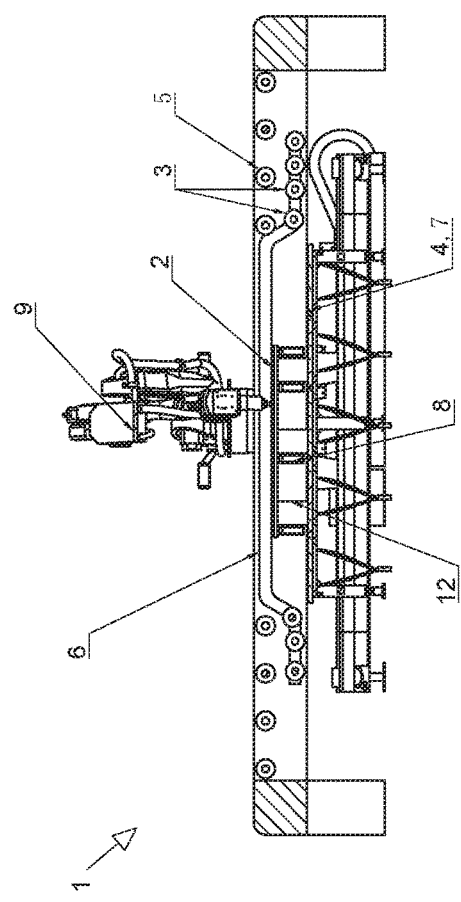
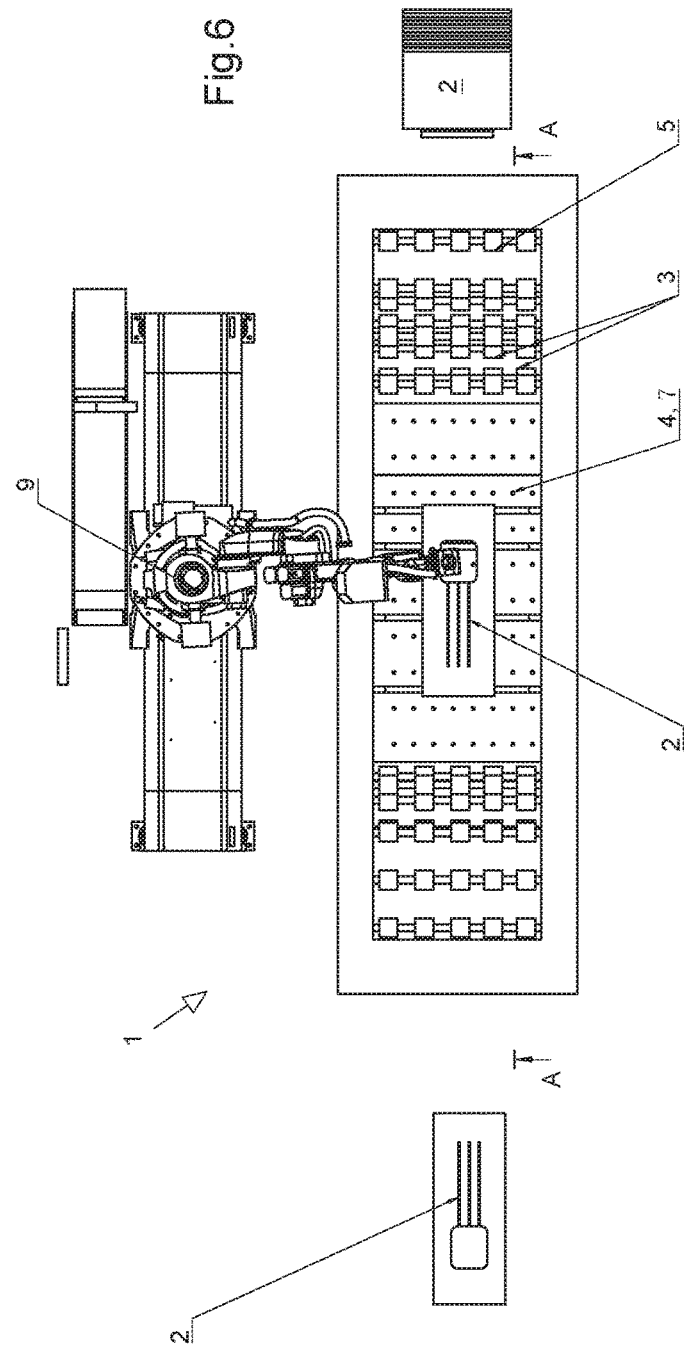

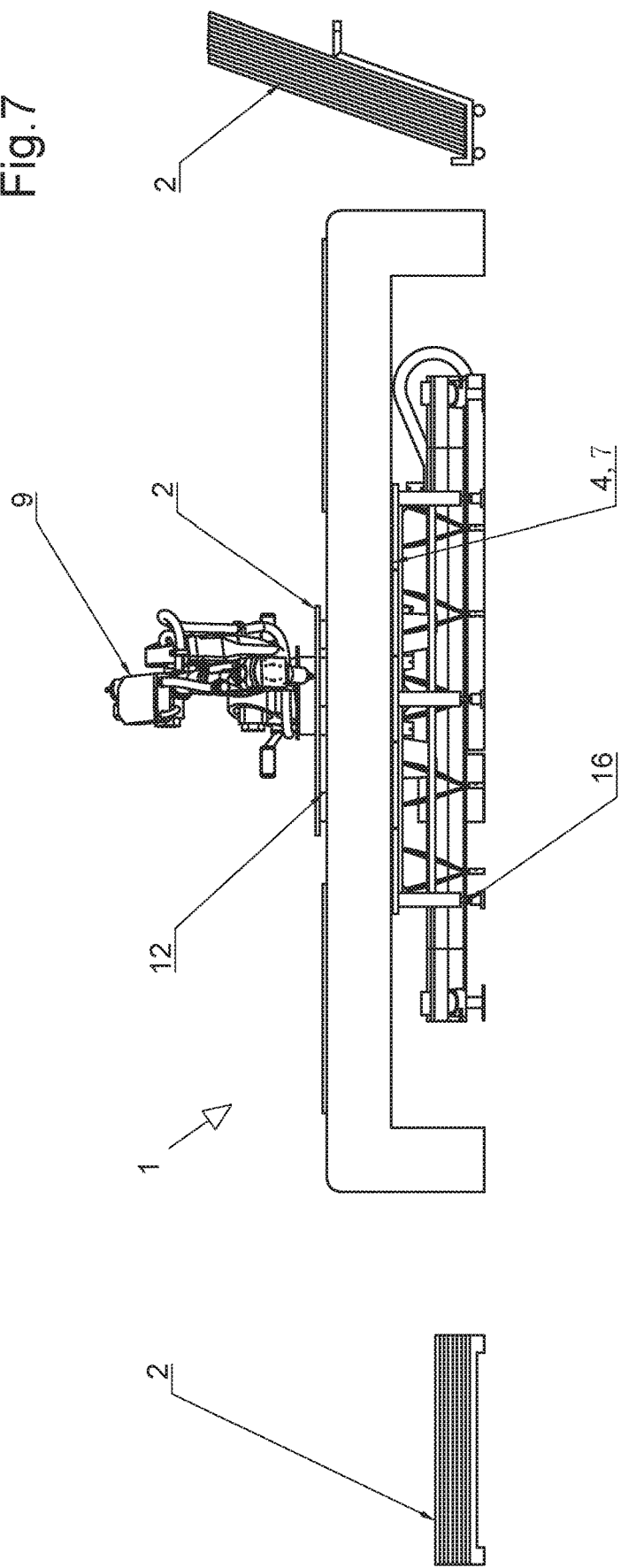

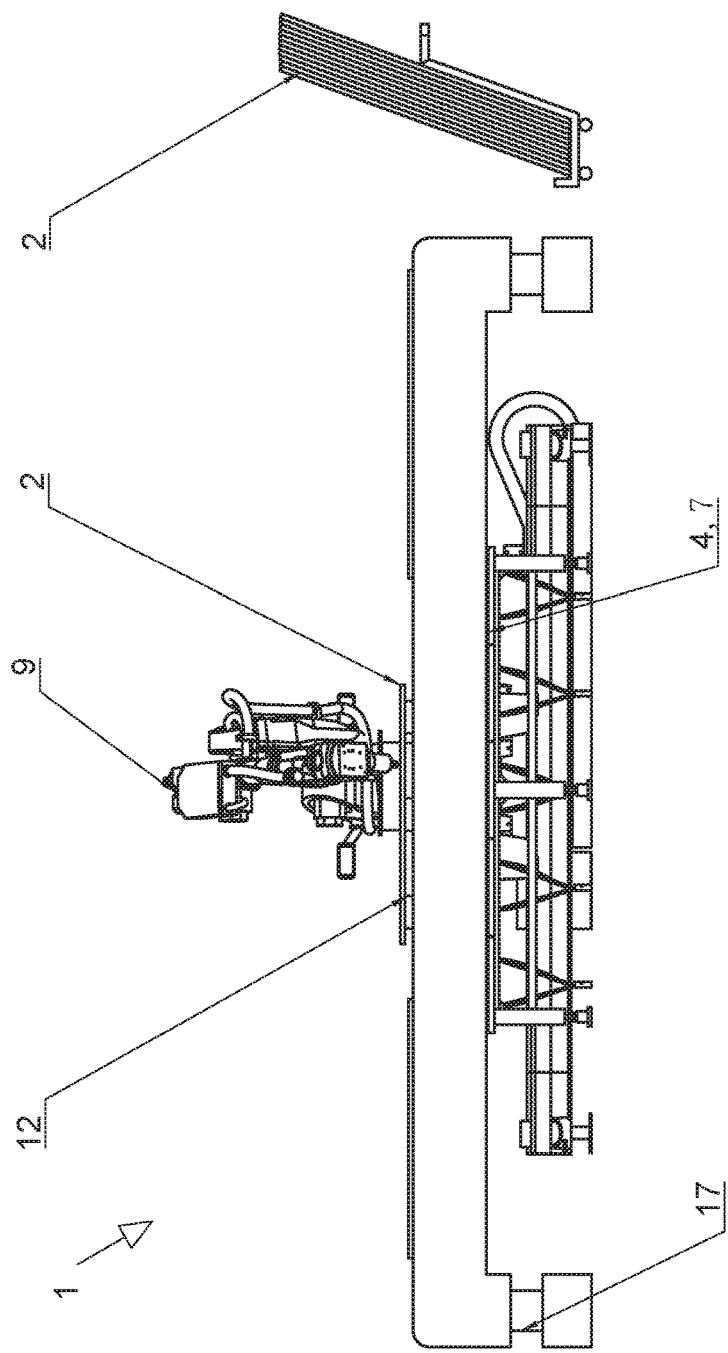
Fig. 8
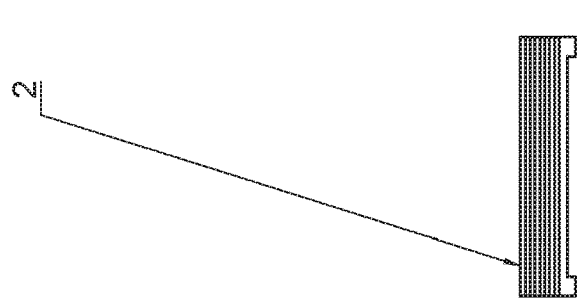

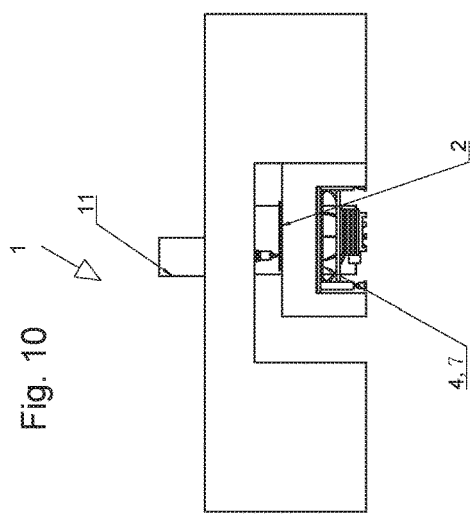
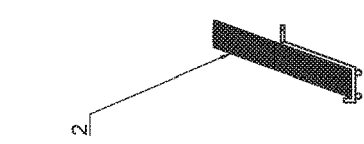
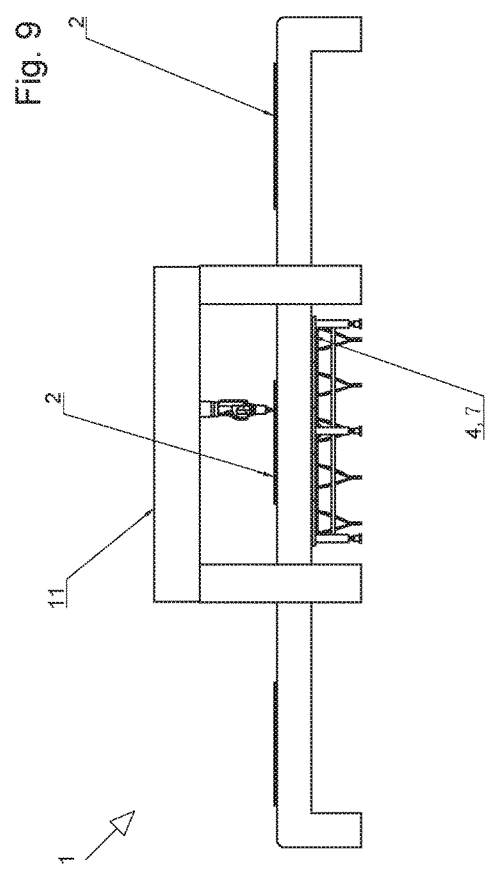
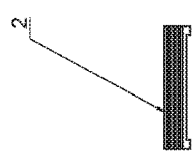
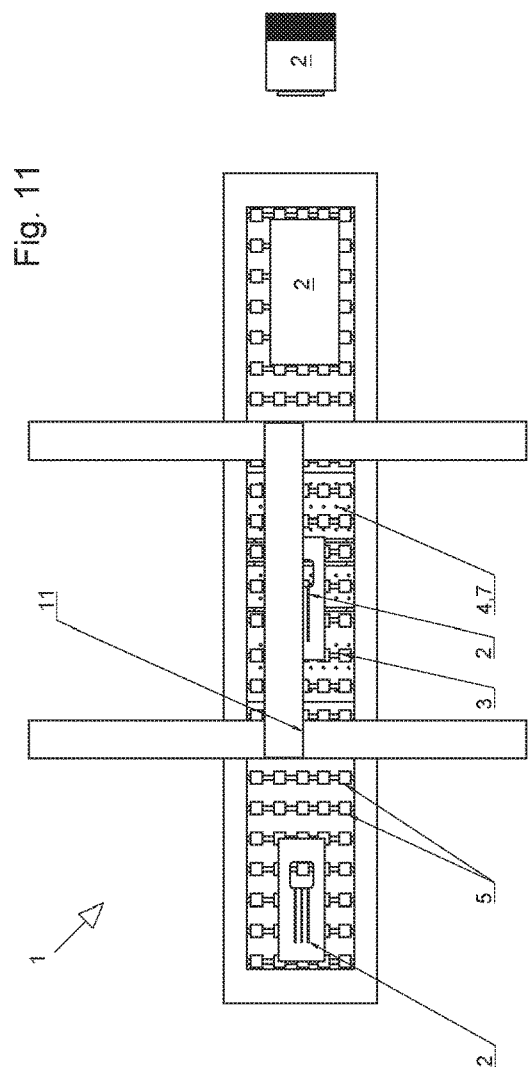
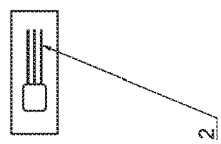

AUTONOMOUS PROCESSING STATION

TECHNICAL FIELD OF INVENTION

The invention relates to an autonomous processing station for processing a workpiece having the features of the preamble described herein. In particular, a machining operation such as milling, grinding and/or drilling is provided, potentially also laser machining, bonding, soldering, welding, painting, film-wrapping, and labeling of workpieces made of glass, ceramic, wood, plastic, stone or metal, and the like. This list provides examples and is not exhaustive.

DISCUSSION OF RELATED ART

It is known to clamp a workpiece on a clamping table of, for example, a milling or drilling machine, and to process this by way of milling or drilling. "Clamping" shall be understood to mean fixing a workpiece so as to be held immovably against forces that occur during processing.

It is the object of the invention to enable simple feeding and removal of a workpiece to and from a clamping table of the processing station.

SUMMARY OF THE INVENTION

This object is achieved by the features described herein. The autonomous processing station according to the invention comprises a clamping table for clamping a workpiece and a conveyor for conveying the workpiece to and from the clamping table, which is disposed above the clamping table. The clamping table may comprise clamping jaws, for example, for mechanically clamping the workpiece. Preferably, the processing station comprises a suction table, serving as the clamping table, which secures the workpiece resting thereon by way of suction using negative pressure, which shall be regarded as clamping within the meaning of the invention.

So as to place the workpiece from the conveyor onto the clamping table, the conveyor can be opened in a region over the clamping table, which is to say, an opening can be established in the conveyor, through which the workpiece can be lowered onto the clamping table and/or, conversely, the clamping table can be raised so that the workpiece rests thereon and can be clamped.

Furthermore, the processing station according to the invention comprises a lifting device by way of which, when the conveyor is open, the workpiece can be lowered onto the clamping table and/or the clamping table can be raised and/or the conveyor can be lowered, so that the workpiece rests on the clamping table. The workpiece is preferably raised to such an extent, or the conveyor is preferably lowered to such an extent, that the workpiece can be easily accessed from all sides, except from the bottom, for processing.

A workpiece to be processed is placed onto the conveyor and conveyed across the clamping table. The lifting device grabs the workpiece, and the conveyor is opened, whereupon the workpiece is lowered and placed onto the clamping table and/or the clamping table is raised, so that the workpiece rests on the clamping table and can be clamped and processed. After processing, the workpiece is unclamped and grabbed by the lifting device again, wherein the workpiece, conversely, may also first be grabbed by the lifting device and then be unclamped, or may be grabbed by the lifting device as it is being unclamped. The workpiece is raised and/or the clamping table is lowered, the conveyor is closed again, and the workpiece is removed from the clamping table by the conveyor. A new workpiece can be placed onto the conveyor and/or a processed workpiece can be removed from the conveyor, while a workpiece that is resting on the clamping table and is clamped in place is being processed.

One embodiment of the invention provides for a multiaxis robot, serving as the lifting device, for lowering the workpiece onto the clamping table and raising this onto the conveyor after processing. The robot can comprise a mechanical and/or pneumatic gripping device and/or a support for the workpiece, for example in the manner of a lifting fork of a forklift truck. The robot may also be used to process the workpiece.

Another possibility is to provide one or more pneumatic or hydraulic lifting cylinders in addition to, or instead of, the robot as the lifting device, or as part of a lifting device, for lowering and raising the workpiece onto and off the clamping table.

One embodiment of the invention provides for a horizontal linear conveyor, for example a belt conveyor, for moving the workpiece across the clamping table and, after processing, away from the clamping table. One refinement of the invention provides for a roller conveyor, having rollers that can be moved to the side over the clamping table for opening the roller conveyor, so that a workpiece support region of the clamping table is exposed, seen from above. The opening step creates an opening in the roller conveyor or, in general, in the conveyor, through which the workpiece can be lowered onto the clamping table, or the clamping table can be raised, so that the workpiece rests thereon.

The features disclosed in the above general description, the following description of an exemplary embodiment, the claims and the drawing can each be present alone, as a plurality together in any arbitrary combination, or all in embodiments of the invention. An embodiment of the invention that does not include all the features recited in the claims is also possible. The aforementioned embodiments and configurations of the invention can be arbitrarily combined.

BRIEF DESCRIPTION OF THE DRAWINGS

The invention will be described in more detail hereafter based on an exemplary embodiment shown in the drawings. In the drawings:

FIGS. 1, 3, 5, 7 and 8 show a longitudinal sectional view of an autonomous processing station according to the invention along line A-A in FIGS. 2, 4 and 6;

FIGS. 2, 4 and 6 show a view of the processing station from FIGS. 1, 3, 5, 7 and 8 from above;

FIG. 9 shows a longitudinal sectional view of a second embodiment of an autonomous processing station according to the invention;

FIG. 10 shows a front view of the processing station from FIG. 9; and

FIG. 11 shows a view of the processing station from FIG. 9 from above.

DETAILED DESCRIPTION OF THE INVENTION

The autonomous processing station 1 according to the invention shown in FIGS. 1 to 6 is provided for machining and/or otherwise processing workpieces 2 made, for example, of glass, ceramic, wood, plastic, stone or metal, having essentially any arbitrary shape, wherein the workpieces 2 have a preferably planar underside for pneumatic clamping by way of negative pressure. In the exemplary embodiment, plate-shaped workpieces 2 are shown.

The processing station 1 comprises a horizontal linear conveyor which, in the exemplary embodiment, is a roller conveyor 3, for conveying the workpiece 2 to and from a clamping table 4, which is disposed beneath the roller conveyor 3. Rollers 5 of the roller conveyor 3 can be driven so as to rotate individually or, in any case, by way of each axle. In a longitudinal center region of the roller conveyor 3, as can be seen in FIGS. 1, 3, 4 and 6, movable rollers 5 can be moved to the side, which is to say in the direction of the ends of the roller conveyor 3, beneath stationary rollers 5, so that the roller conveyor 3 can be opened over the clamping table 4, whereby an opening 6 is created, exposing a workpiece support region of the clamping table 4, seen from above, as can be seen in FIGS. 3, 4, 5 and 6.

In the exemplary embodiment, the clamping table 4 is a suction table 7, which clamps a workpiece 2 resting thereon by way of negative pressure, which is to say holds this immovably against forces that occur during the processing of the workpiece 2. Suction openings in the suction table 7 can be opened and closed individually. The suction table 7 is divided into sections which, in the exemplary embodiment, are rectangular, as is apparent from FIGS. 4 and 6, and extend across a width of the roller conveyor 3. Other shapes are possible for the sections of the suction table 7, such as triangles or hexagons (not shown).

The workpiece 2, as is apparent in FIG. 2, is placed at one end (the right in FIG. 2), onto the roller conveyor 3, and conveyed across the clamping table 4. Before the roller conveyor 3 is opened, the workpiece 2 is held by a lifting device 8, 9 (FIGS. 3 and 4). In the exemplary embodiment, the processing station 1 comprises a multi-axis robot 9 for processing the workpiece 2, which also forms a lifting device. For the use as a lifting device, the multi-axis robot 9 comprises, for example, a mechanical or pneumatic gripper (not shown). In the exemplary embodiment, the multi-axis robot 9 comprises a lifting fork 10, such as is known from forklift trucks, as support for the workpiece 2. By way of the lifting fork 10, the multi-axis robot 9 reaches beneath the workpiece 2, between the movable rollers 5 of the roller conveyor 3, which are then moved to the side beneath the stationary rollers 5 for opening the roller conveyor 3. Thereafter, the multi-axis robot 9 forming the lifting device lowers the workpiece 2 onto the suction table 7, which clamps the workpiece 2 by way of negative pressure.

The workpiece 2 clamped on the suction table 7 is processed by the multi-axis robot 9 (FIGS. 5 and 6) which, for this purpose, places the lifting fork 10 into a tool magazine and removes a tool, such as a drill, a milling cutter or a grinder, from the tool magazine, and processes the workpiece 2 through the opening 6 of the roller conveyor 3.

A further dedicated hydraulic, pneumatic or electromechanical lifting device 8 is disposed beneath the roller conveyor 3 of the autonomous processing station 1. The workpiece 2 can be lowered from the roller conveyor 3 onto the suction table 7 forming the clamping table 4 and/or be raised again after processing, by the lifting device 8, instead of by the multi-axis robot 9.

Two further options for transferring the workpiece 2 from the conveyor 3 onto the clamping table 4 for processing, and back onto the conveyor 3 after processing, include a clamping table 4 that can be raised to the level of the conveyor 3 (FIG. 7) and/or a linear or roller conveyor 3 that can be lowered at least to the level of the clamping table 4 (FIG. 8). For this purpose, the clamping table 4 or suction table 7 in FIG. 7, and the linear or roller conveyor 3 in FIG. 8, comprise lifting cylinders 12; 17. The clamping table 4 is raised to such an extent, or the linear or roller conveyor 3 is lowered to such an extent, that a support surface of the clamping table 3 is located at least at the height of an upper face of the linear or roller conveyor 3. In this way, the workpiece 2 present on the support surface of the clamping table 4 can be easily accessed from all sides (except the underside located on the support surface of the clamping table 4) for processing. For example, a rack or a frame of the linear or roller conveyor 3 and the rollers 5 of the roller conveyor 3 are not in the way for processing the workpiece 2. The support surface of the clamping table 4 is the surface area on which the workpiece 2 is disposed for processing, and on which it is fixed by clamping.

After processing, the workpiece 2 is raised again to or above the level of the stationary rollers 5 of the roller conveyor 3 by the multi-axis robot 9, or the lifting device 8, the roller conveyor 3 is closed, which is to say the movable rollers 5 are moved beneath the workpiece 2, the workpiece 2 is placed onto the roller conveyor 3 and conveyed away from the clamping table 4 to a removal region of the roller conveyor 3 (the left in FIG. 2), where it can be removed from the roller conveyor 3, while another workpiece 2 is already being conveyed by the roller conveyor 3 across the clamping table 4.

In FIGS. 9 to 11, the autonomous processing station 1 according to the invention comprises a gantry machine tool 11 for processing the workpiece 2 and, if necessary, a lifting device 8 for lowering and raising the workpiece 2 off the roller conveyor 3 or, in general, off the horizontal linear conveyor. In the remaining aspects, the processing station 1 in FIGS. 5 to 7 agrees with that in FIGS. 1 to 4 and, in relation to the description of FIGS. 5 to 7, reference is made to the foregoing description of FIGS. 1 to 4.

The invention claimed is:

1. An autonomous processing station for processing a workpiece, comprising a clamping table for clamping the workpiece, wherein the processing station comprises a conveyor for conveying the workpiece to and from the clamping table, the clamping table is disposed beneath the conveyor, the conveyor can be opened over the clamping table for clamping the workpiece, wherein the processing station comprises a suction table, serving as the clamping table, and wherein the processing station comprises a lifting device by way of which the lifting device can at least one of lower the workpiece onto the clamping table, and raise the clamping table so that the workpiece rests on the clamping table.

2. The autonomous processing station according to claim 1, wherein the processing station comprises a multi-axis robot, serving as the lifting device, for lowering the workpiece onto the clamping table.

3. The autonomous processing station according to claim 1, wherein the processing station comprises a lifting device for lowering the workpiece onto the clamping table.

4. The autonomous processing station according to claim 1, wherein the clamping table can be raised so that a support surface of the clamping table is located at least at the height of an upper face of the conveyor.

5. The autonomous processing station according to claim 1, wherein the conveyor can be lowered so that a support surface of the clamping table is located at least at the height of an upper face of the conveyor.

6. The autonomous processing station according to claim 1, wherein the processing station comprises at least one of a horizontal and a vertical linear conveyor.

7. The autonomous processing station according to claim 6, wherein the processing station comprises a roller conveyor, having rollers that can be moved to the side over the clamping table for opening the roller conveyor, so that a workpiece support region of the clamping table is exposed, as seen from above.

\* \* \* \* \*